(12) United States Patent
Vasylyev (10) Patent No.: US 10,823,368 B2
(45) Date of Patent: Nov. 3, 2020

(54) LIGHT DIRECTING STRUCTURES

(71) Applicant: Sergiy Vasylyev, Elk Grove, CA (US)

(72) Inventor: Sergiy Vasylyev, Elk Grove, CA (US)

(73) Assignee: SW TECHNOLOGY INNOVATIONS, INC., Sacramento, CA (US)

( * ) Notice: Subject to any disclaimer, the term of this patent is extended or adjusted under 35 U.S.C. 154(b) by 0 days.

(21) Appl. No.: 16/236,469

(22) Filed: Dec. 29, 2018

(65) Prior Publication Data

US 2019/0137073 A1    May 9, 2019

Related U.S. Application Data

(63) Continuation of application No. 14/639,083, filed on Mar. 4, 2015, now abandoned, which is a continuation of application No. 13/662,311, filed on Oct. 26, 2012, now Pat. No. 9,004,726.

(60) Provisional application No. 61/552,332, filed on Oct. 27, 2011.

(51) Int. Cl.
*F21V 5/02* (2006.01)
*G02B 5/02* (2006.01)
*F21V 8/00* (2006.01)

(52) U.S. Cl.
CPC .............. *F21V 5/02* (2013.01); *G02B 5/0236* (2013.01); *G02B 5/0278* (2013.01); *G02B 6/001* (2013.01); *G02B 6/0053* (2013.01)

(58) Field of Classification Search
CPC ........ G02B 5/02–06; G02B 6/00–0095; F21V 5/00; F21V 5/02
See application file for complete search history.

(56) References Cited

U.S. PATENT DOCUMENTS

| | | |
|---|---|---|
| 3,009,389 A | 11/1961 | Ewing |
| 3,393,034 A * | 7/1968 | Senzo ................ F21V 5/02 |
| | | 359/593 |
| 3,603,670 A | 9/1971 | Kim |
| 4,519,675 A | 5/1985 | Bar-Yonah |
| 4,542,449 A | 9/1985 | Whitehead |
| 4,799,137 A | 1/1989 | Aho |
| 4,930,867 A | 6/1990 | Negishi |
| 5,005,108 A | 4/1991 | Pristash et al. |
| 5,471,348 A | 11/1995 | Miller et al. |
| 5,475,785 A | 12/1995 | Johanson |
| 5,731,900 A | 3/1998 | Milner |

(Continued)

OTHER PUBLICATIONS

3M Optical Systems Product brochure: Vikuiti™ Transmissive Right Angle Film II (TRAF II) http://www.3m.com/product/information/Vikuiti-Transmissive-Right-Angle-Film.html.

*Primary Examiner* — Mariceli Santiago (57) ABSTRACT

Light directing film structure employing at least two layers having different refractive indices and forming a continuous corrugated boundary between major surfaces of the film. The corrugated boundary forms a plurality of alternating facets forming different dihedral angles with a prevalent plane of the film structure. The facets may longitudinally extend along a straight, arcuate, circular, or curvilinear path. Light received by a major surface of the film structure is internally redirected by interacting with the facets of the corrugated inter-layer boundary and may be emitted from the opposing major surface towards a new propagation direction which is different from the original propagation direction.

16 Claims, 5 Drawing Sheets

(56) References Cited

U.S. PATENT DOCUMENTS

| | | | |
|---|---|---|---|
| 5,771,328 A | 6/1998 | Wortman et al. | |
| 5,880,886 A * | 3/1999 | Milner | E06B 9/24 |
| | | | 359/592 |
| 5,926,601 A | 7/1999 | Tai et al. | |
| 6,021,007 A | 2/2000 | Murtha | |
| 6,031,958 A | 2/2000 | McGaftigan | |
| 6,166,787 A * | 12/2000 | Akins | G02B 1/11 |
| | | | 348/337 |
| 6,239,851 B1 | 5/2001 | Hatazawa et al. | |
| 6,311,437 B1 | 11/2001 | Lorenz | |
| 6,347,874 B1 | 2/2002 | Boyd | |
| 6,437,921 B1 | 8/2002 | Whitehead | |
| 6,545,827 B1 | 4/2003 | Okabe et al. | |
| 6,616,285 B2 | 9/2003 | Milner | |
| 6,958,868 B1 | 10/2005 | Pender | |
| 6,980,728 B2 | 12/2005 | Ladstatter | |
| 7,070,314 B2 | 7/2006 | Edmonds | |
| 7,251,079 B2 | 7/2007 | Capaldo et al. | |
| 7,265,800 B2 | 9/2007 | Jagt et al. | |
| 7,374,313 B2 | 5/2008 | Cassarly et al. | |
| 7,416,315 B2 | 8/2008 | Blumel | |
| 7,418,202 B2 | 8/2008 | Biernath et al. | |
| 7,468,764 B2 | 10/2008 | Fukushima et al. | |
| 7,448,775 B2 | 11/2008 | Parker et al. | |
| 7,775,700 B2 | 8/2010 | Lee | |
| 7,914,192 B2 | 5/2011 | Coleman | |
| 8,031,276 B2 | 10/2011 | Woodgate et al. | |
| 8,411,230 B2 | 4/2013 | Nilsen et al. | |
| 2001/0019479 A1 | 9/2001 | Nakabayashi et al. | |
| 2003/0058383 A1 | 5/2003 | Jagt et al. | |
| 2003/0058386 A1 | 5/2003 | Bastiaansen et al. | |
| 2006/0262557 A1 | 11/2006 | Parker et al. | |
| 2007/0031140 A1 | 2/2007 | Biernath et al. | |
| 2008/0285304 A1 | 11/2008 | Rankin et al. | |
| 2009/0109705 A1 | 4/2009 | Pakhchyan et al. | |
| 2009/0279302 A1 | 11/2009 | Lee | |
| 2010/0007806 A1 | 1/2010 | Woodgate et al. | |
| 2010/0075069 A1 | 3/2010 | Laney et al. | |
| 2011/0199697 A1 | 8/2011 | Campbell et al. | |

* cited by examiner

LIGHT DIRECTING STRUCTURES

CROSS-REFERENCE TO RELATED APPLICATIONS

This application is a continuation of U.S. patent application Ser. No. 14/639,083, filed 4 Mach 2015, which is a continuation of U.S. patent application Ser. No. 13/662,311, filed 26 Oct. 2012, now U.S. Pat. No. 9,004,726. This application also claims priority from U.S. provisional application Ser. No. 61/552,332 filed on Oct. 27, 2011, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention relates to light directing films and light turning films used to redirect light. The present invention also relates to illumination and backlighting devices employing light directing and light turning films, such as wide-area lighting panels, LCD backlights, computer screens, advertising displays, road signs, and the like.

2. Description of Background Art

Conventionally, light directing films employed in backlighting systems include a structured major surface with an array of parallel prisms extending along a direction perpendicular to the plane in which the film is designed to bend the incident light. The prisms are usually arranged side by side and form a plurality of peaks and grooves thus forming a corrugated surface of the film. Applications exist where surface corrugations are unwanted since they are prone to soiling and also complicate surface cleaning. Furthermore, in multi-layer transmissive structures, the corrugations create air pockets between layers which may be unwanted in at least some applications such as those where a monolithic structure is desired. Furthermore, the distributed air pockets represent a layer having a very low refractive index which creates a strong total internal reflection interface. Such interface may prevent certain light rays to pass through the transmissive structure without being reflected, particularly in the applications involving light rays propagating at low angles with respect to the layer surfaces.

It is therefore an object of this invention to provide an improved light directing film having one or more smooth surfaces and eliminating the air spaces associated with surface corrugations of the prior art devices. Other objects and advantages of this invention will be apparent to those skilled in the art from the following disclosure.

BRIEF SUMMARY OF THE INVENTION

Accordingly, the present invention is directed to light directing and light turning films which may be employed to redirect light at various angles with respect to the original propagation direction. More particularly, at least some embodiments of this invention are directed to right angle light turning films and light collimating films.

The present invention solves a number of light redirection and distribution problems within a film-thickness optical system which is not hindered by the limitations of conventional light directing films solely relying upon external surface microstructures to provide light bending function. An advantage of the present system is to provide light redirection within the film body by employing one or more corrugated internal boundaries formed by film layers having different refractive indices. In at least some embodiments, it enables employing a generally smooth light input surface of the film and allows for laminating the light redirecting films onto light distribution objects such as planar and cylindrical optical waveguides.

In at least one embodiment, the invention features an optical film structure having two layers with different refractive indices and a generally smooth light input surface. The continuous boundary between the two layers is shaped in the form of an array of linear corrugations extending along a pre-selected reference line. Each corrugation has at least two facets which form non-zero dihedral angles with a plane which is parallel to the film surface. Light passes through at least one facet and is redirected from its original propagation path by means of refraction or total internal reflection (TIR). The dihedral angles of the facets are selected to generally result in light bending away from the light input surface.

In at least one embodiment, the light redirecting facets of the corrugated inter-layer boundary are configured to provide a two-stage redirection, the first stage by means of refraction and the second stage by means of TIR. The net result is an improved overall light bending capabilities of the film for the common materials available for forming the respective layers of the light directing film.

In at least one embodiment, the light directing film comprises a multilayer structure where two or more two-layer films are stacked on top of each other. Each of the stacked two-layer films may have its own corrugated boundary between two different-index optically transmissive materials. The first film in the stack bends light by a certain angle towards the surface normal. The next film in the stack receives such light and provides additional bend angle. The number of elementary two-layer films in the stack and the configuration of the respective layers may be selected to provide the required overall bend angle of the resulting light directing film.

In at least some embodiments, the light output surface of the light directing film is provided with surface relief features. In one embodiment, the surface relief features comprise light-diffusing texture. In another embodiment, the surface relief features comprise prismatic microstructures. According to various aspects of the invention, the prismatic microstructures may provide additional bending angles for light redirected by the film and may further provide brightness enhancement and/or light collimating functions.

In one embodiment, the light redirecting film is wrapped around a portion of the longitudinal wall of a cylindrical waveguide, such as a large-core optical fiber, rod light pipe or the like. In one embodiment, the inter-layer linear corrugations of the light directing film follow a circular path. In one embodiment, the linear corrugation follows a curvilinear path across the surface of the film.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in the preceding figures. It will be appreciated that the apparatus may vary as to configuration and as to details of the parts without departing from the basic concepts as disclosed herein. Furthermore, elements represented in one embodiment as taught herein are applicable without limitation to other embodiments taught herein, and in combination with those embodiments and what is known in the art.

A wide range of applications exist for the present invention in relation to the collection of electromagnetic radiant energy, such as light, in a broad spectrum or any suitable spectral bands or domains. Therefore, for the sake of simplicity of expression, without limiting generality of this invention, the term "light" will be used herein although the general terms "electromagnetic energy", "electromagnetic radiation", "radiant energy" or exemplary terms like "visible light", "infrared light", or "ultraviolet light" would also be appropriate.

The present invention seeks to provide light directing films capable of changing the light propagation direction and having a monolithic structure with at least one smooth external surface.

According to the present invention, there is provided an optically transmissive light directing film comprising at least two layers of different materials having a joint boundary enclosed between the two external parallel surfaces of the film. The light directing film comprises at least a first layer having a first refractive index and a second layer having a second refractive index which is different from the refractive index of the first layer. Both layers extend generally parallel to each other and parallel to the opposing broad-area surfaces of the film. The materials for both layers are preferably selected from solid polymeric optical materials having good broadband optical clarity and transmission. When the light directing film is designed to operate in a specific spectral range, the materials should be transmissive at least in that spectral range. It is also preferred that there is no opaque material include between the first and second layers of the light directing film.

The first layer and the second layer are disposed in contact with each other along the entire width of the light directing film and jointly form an internal corrugated boundary having a zig-zag shape in a cross-section. The boundary corrugations, each having a triangular cross sectional shape, extend parallel to each other and define a first array of optical interface facets inclined at a first dihedral angle with respect to the surface of the film and a second array of optical interface facets inclined at a second dihedral angle with respect to the surface of the film. Any of the facets may have a curved surface, but ordinarily each facet is planar.

The facets of the first array alternate with the facets of the second array so that the boundary between the two layers has a saw-tooth contour in a cross-section perpendicular to the longitudinal axis of the corrugations. The cross-sectional contour may be described by a continuous series of generally straight lines connecting alternating peaks and valleys of the corrugations. The height and width of the corrugations may be varied in a broad range, but ordinarily all of the corrugations may have identical, uniform dimensions and constant pitch across the extent of the light directing film.

The first dihedral angle may be the same as the second dihedral angle, in which case the corrugated boundary will be formed by adjacent pairs of identical facets where the facets are disposed symmetrically, within each pair, with respect to a plane perpendicular to the surface of the light directing film.

However, the first and second dihedral angles may also be made different from each other, taking any angular value between 0° and 90°.

The respective layers of the light directing film may be made from a suitable polymeric material including but not limited to optical quality PMMA (acrylic), silicone, polycarbonate, PET (polyethylene terephthalate), polystyrene, polyolefin, polyesters, APET, PETG, or PVC, as well as any optically clear resin which is obtainable by polymerization and curing of various compositions. Suitable materials for the layer having a lower refractive index of the two may advantageously be selected for low-n fluoropolymers or resins, such as, for example, FEP, ETFE (both having a refractive index of 1.3-1.35), PFTE AF 1600 and PFTE AF 2400, certain silicones and the like.

Each of the facets of the corrugated boundary forms an optical interface characterized by a step change in the refractive index. As a result, each of the facets will bend the light striking the facet at any incidence angle other than 0° or 90°. It will be appreciated by those skilled in the art that, depending on the orientation of the facets with respect the incident light and depending on whether the refractive index increases or decreases along the light path, the facets may primarily bend light by means of refraction or a total internal reflection (TIR).

It will be further appreciate that, when referring to light or other waves passing through a boundary formed between two different refractive media, such as air and glass, the ratio of the sines of the angles of incidence and of refraction is a constant that depends on the ratio of refractive indices of the media (the Snell's law of refraction). The following relationship can describe a light bending property of an interface between two refractive media: $n_I \sin \phi_I = n_R \sin \phi_R$ where $n_I$ and $n_R$ are the refractive indices of the material where the light is incident from and of the material where the light refract to, respectively, and $\phi_I$ and $\phi_R$ are the angle of incidence and the angle of refraction, respectively. It will be further appreciated that such optical interface can also be characterized by the angle of a Total Internal Reflection (TIR) which is the value of $\phi_I$ for which $\phi_R$ equals 90°. A TIR angle $\phi_{TIR}$ can be found from the following expression:

$$\phi_{TIR} = \arcsin(n_R/n_I \sin 90°) = \arcsin(n_R/n_I)$$

In an exemplary case of the interface between acrylic with the reflective index $n_I$ of about 1.49 and air with $n_R$ of about 1, $\phi_{TIR}$ is approximately equal to 42°.

A preferred method of forming the layers of the light directing film involves forming one of the layers first from a film of the respective transmissive material. This first-formed layer is preferably provided with surface corrugations which accurately replicate the corrugations of the layer boundary to be incorporated internally into the light directing film.

The surface corrugations of the first-formed layer may be ordinarily formed using replication from a master mold or cylinder carrying a negative replica of the intended surface microstructures employing common processes such as hot embossing, casting or extrusion. Masters for the replication or casting tools used for manufacturing the light directing films described herein, may be made by any known technique, such as diamond machining, for example.

The surface corrugations of the first-formed layer may also be formed one at a time by various direct surface modification processes including, for example, micromachining, scribing by a diamond tool, selective laser ablation, etching and the like methods. When high fidelity of the corrugations is required and/or when they are formed by extra fine microstructures, they may be also fabricated by photolithography using gray scale photomasks and thick photoresists.

The other layer may be deposited over the corrugations of the first-formed layer in a liquid form with the subsequent curing by means of irradiation UV or visible-spectrum radiation, heat, moisture, precursor evaporation, etc. Alternatively, the second-formed layer may be provided in the form of a sufficiently thick, viscous resin evenly spread over the first-formed layer placed on a leveled surface. The finished light directing film may then be obtained by applying pressure on top of the second-formed layer so that the viscous resin could conform to the shape of the corrugations of the first-formed layer. The second-formed layer may also be made in the form of a film which may then be heated to a softening point and impressed onto the first-formed layer thus also conforming to the shape of the corrugations. In the latter case, the material of the second-formed layer should preferably have a lower softening point than the material of first-formed layer.

The light directing films of the present invention utilize the light bending capability of the corrugated interface between the first layer and the second layer. The light directing film may be configured so that at least some of the facets forming the inter-layer corrugations redirect incident light by means of refraction, TIR, or both. The surface corrugations may be configured to include at least two types of facets, each type making a different dihedral angle with the film surface than the other one. Both types of the facets may be configured to direct light by means of either refraction or TIR. Also, one of the types of the facets may be configured to refract light and the other one may be configured to reflect light by means of TIR.

The light directing film finds particular utility in LCD backlights, advertising backlights and front lights, signage, panel lighting, beam steering, and the like. In some more particular examples, the light directing film may be used as a brightness enhancement film or as a light turning film in the applications employing planar waveguides, such as edge-lit lighting panels, signs or LCD screens.

According to preferred embodiments of the present invention, the light directing film is configured to have a generally smooth, broad-area light input surface opposing to the broad-area light output (light emitting) surface. Since the light directing film has a smooth light input surface, it may be laminated onto another optical structure such as an edge-lit planar waveguide or an end-lit large-core optical fiber with a good physical and optical contact. The good optical contact with no air gap substantially reduces the drop in the refractive index outwardly from the underlying optical structure and increases the effective TIR angle within the structure. Accordingly, the lamination of the light input surface onto the optical waveguide structure may provide for a generally unimpeded light passage from such optical structure into the light directing film in a broad range of incidence angles. Thus, the light directing film over-laminated to the optical waveguide structure may be configured to efficiently extract light from such optical structure and further provide the intended light redirection function.

The light output surface may also be made generally smooth so that additional layers may be laminated on top of the light directing film thus forming an intermediate light-bending layer in the resulting monolithic, multi-layer optical structure. The top layers disposed above the light directing film may have various functions, such as protection from scratching, abrasion, forming a chemical or radiation barrier, and the like. Furthermore, two or more light directing films can be stacked on top of each other forming a multi-layer light turning structure, for example, to increase the bend angle of otherwise alter or complement the light directing operation of a single film layer. According to at least one embodiment, an external surface of the light directing film may be optionally mirrored in order to provide a reflective light bending film structure.

The present invention will now be described by way of example with reference to the accompanying drawings.

Figure 1:
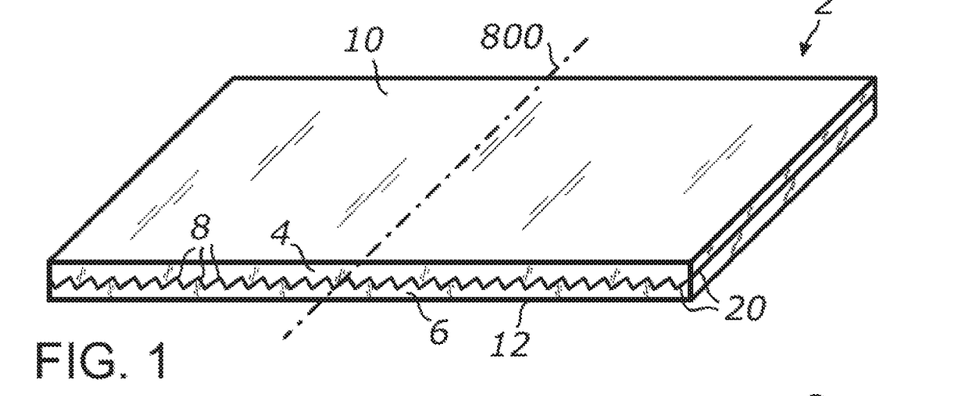
FIG. 1 is a schematic perspective view of a light directing film, according to at least one embodiment of the present invention.

FIG. 1 depicts a portion of light directing film 2 in accordance with one embodiment of the invention. Film 2 is provided with smooth external surfaces exemplified by a first broad-area surface 10 and an opposing second broad-area surface 12 which extends parallel to surface 10. Film 2 comprises at least two optical layers disposed in contact with each other. The two optical layers include a first layer 4 of a first transparent material and a second layer 6 of a second transparent material.

The materials of layer 4 and layer 6 have different refractive indices and form a joint boundary 20 which represents an optical interface characterized by a stepped change of refractive index between the respective transmissive materials. Boundary 20 has a structured, corrugated shape which is defined by a plurality of prismatic corrugations 8 extending parallel to each other. Corrugations 8 may extend generally parallel to a pre-determined reference line 800 which may hereinafter also be referenced to as a longitudinal axis of the respective corrugations. The orientation of reference line 800 and, hence, the orientation of corrugations 8, may be selected based on the intended direction of propagation of light incident onto the light directing film 2.

According to one embodiment, the orientation of reference line 800 may be made generally perpendicular to a plane in which film 2 is supposed to provide light redirection. When film 2 has a well defined rectangular shape, the reference line 800 may be selected to extend parallel to one of the planar dimensions of the respective rectangle.

Figure 2:
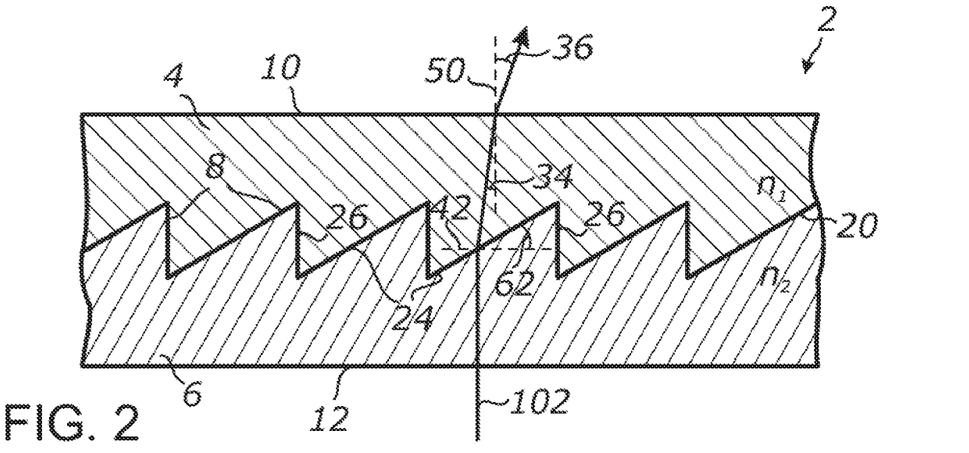
FIG. 2 is a schematic cross-sectional view of a light directing film portion, according to at least one embodiment of the present invention.

FIG. 2 depicts a schematic cross-section of a portion of light directing film 2 in accordance with one embodiment. In the case illustrated in FIG. 2, first layer 4 has a refractive index $n_1$ which is lower than a refractive index $n_2$ of layer 6. Each of the parallel surfaces 10 and 12 may be made smooth and planar. However, the boundary 20 between layer 4 and layer 6 represents a continuous corrugated surface formed by an uninterrupted sequence of linear prismatic corrugations 8.

Each of corrugations 8 has the shape of a triangular prism in a cross-section perpendicular to the longitudinal axis of the corrugation. Each corrugation 8 defines a pair of facets 24 and 26 so that corrugated surface of boundary 20 comprises a plurality of facets 24 alternating with facets 26. Each faced 24 forms a dihedral angle 62 with respect to a plane which is parallel to surfaces 10 and 12. Each facet 26 is normal to either surface.

In operation, referring to FIG. 2, surface 12 may be designated as the light input surface and surface 10 may be designated as a light output surface with respect to the incident light. Referring further to FIG. 2, an incident ray 102 enters film 2 through surface 12 at a normal angle with respect to the plane of the surface.

It will be appreciated that each of the surfaces 10 and 12 may be characterized by a surface normal in a vicinity of a ray entrance onto the surface of film 2. It will also be appreciated that, in case of the parallelism of surface 10 and 12, a normal to one of such surfaces will also be a normal to the other surface. Additionally, at least the area of film 2 in the vicinity of light ray entrance may be characterized by a prevailing plane which is parallel to both surface 10 and 12. Accordingly, a normal 50 to surface 12 will also be a normal to surface 10 and to the prevailing plane along an optical path of a ray transversally crossing film 2. In the optical terms, ray 102 entering into the surface of film 2 at a normal angle will have a zero incidence angle with respect to surface normal 50.

Ray 102 subsequently strikes the optical interface formed by the boundary 20 between layer 6 and layer 4. Particularly, ray 102 strikes one of facets 24. Since facet 24 is inclined at an angle with respect to light input surface 12, ray 102 undergoes refraction which increases the ray's propagation angle with respect to surface normal 50. At the same time, the refraction of ray 102 decreases an angle 62 which ray 102 makes with respect to a reference line 42 being parallel to surfaces 10 and 12. Upon leaving facet 24 and entering layer 4, ray 102 makes a non-zero angle 34 with respect to normal 50.

The air surrounding film 2 has a refractive index or around 1, which is lower than the refractive index of layer 4. Therefore, as ray 102 emerges from layer 4 at surface 10, it obtains an even greater emergence angle 36 with respect to surface normal 50 compared to angle 34. It will be appreciated that in the configuration of film 2 and light path geometry illustrated in FIG. 2, emergence angle 36 will always be greater than the zero incidence angle of ray 102 onto surface 12. It will also be appreciated that film 2 of FIG. 1 and FIG. 2 can also effectively bend light in a reversed operation, e.g., when light enters film 2 through surface 10 instead of surface 12 and emerges from surface 12. This reversed operation can be understood, for example, by reversing the path of ray 102 in FIG. 2. It should also be understood that the illustrated structure of film 2 may also refract and bend rays entering its surface at incidence angles other than normal. Accordingly, film 2 may be configured to redirect light rays incident onto its surface in a broad range of incidence angles and redirect such rays at different angles thus providing new propagation directions to each ray.

Figure 3:
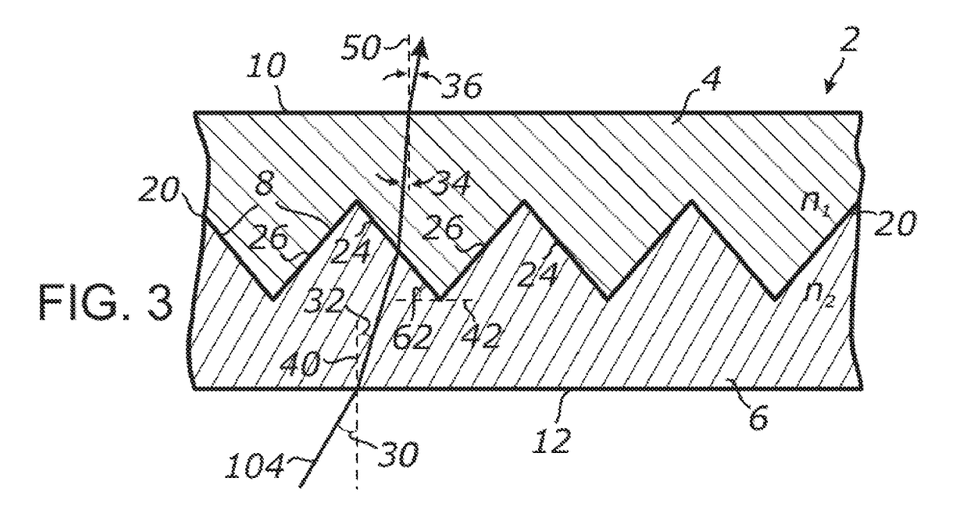
FIG. 3 is a schematic view and ray tracing for light directing film portion, showing a boundary between two transmissive layers comprising isosceles prismatic facets, according to at least one embodiment of the present invention.

FIG. 3 depicts an embodiment of light directing film 2 which is similar to that of FIG. 2 except that each of corrugations 8 is shaped as an isosceles triangular prism where each of the facets 24 and 26 a makes the same dihedral angle 62 with respect to the prevailing plane of film 2.

In operation, a ray 104 strikes external surface 12 of film 2 which is also a smooth external surface of layer 6. Ray 104 makes an incidence angle 30 with respect to a surface normal 40 and refracts into layer 6 at a refraction angle 32 with respect to the same normal. Ray 104 further strikes facet 24 where it refracts into layer 4 in response to the slope of facet 24 and to the difference between refractive indices $n_1$ and $n_2$. As ray 104 strikes surface 10 of film 2, it makes incidence angle 34. The light input surface 10 represents a smooth external surface of layer 4 and is configured for an unimpeded transversal light passage. Upon refracting at surface 10, ray 104 emerges from the other side of film 2 at emergence angle 36 which is generally different than angle 30. It will be appreciated that, when $n_1 < n_2$, angle 36 will generally be lower than angle 30. Thus, film 2 in the exemplary configuration illustrated in FIG. 3 may be used for reducing the angular spread of light which finds utility in devices like brightness enhancement films.

It is noted that the configuration of film 2 depicted in FIG. 3 may also be operated in a reversed mode in which case the film may be configured to increase the divergence of light and may act as a light spreading or light diffusing film.

Figure 4:
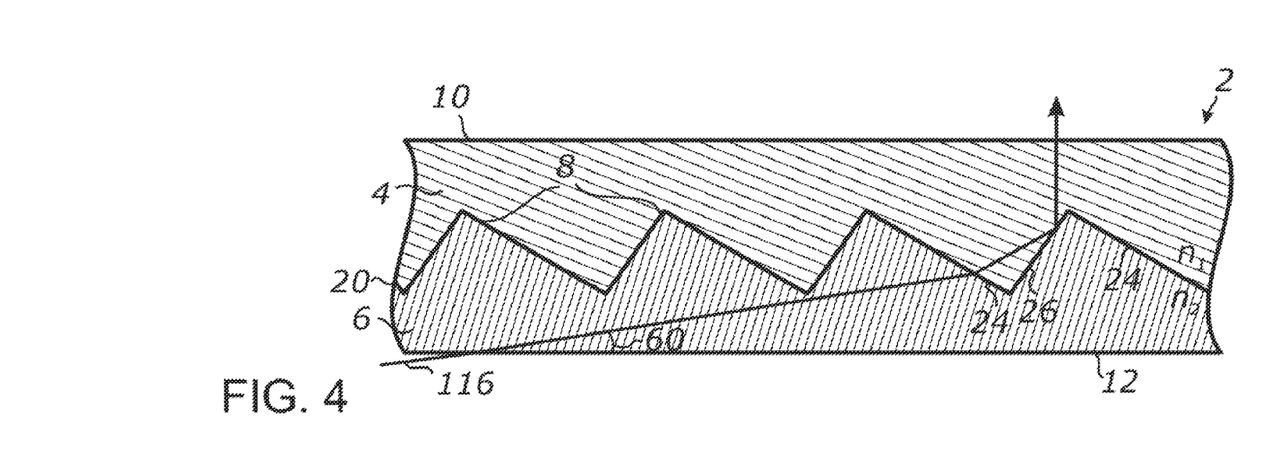
FIG. 4 is a schematic view and ray tracing for light directing film portion configured for turning light entering the film at near-grazing angles, according to at least one embodiment of the present invention.

FIG. 4 illustrates an embodiment of light directing film 2 employing a two-stage redirection which may generally result in greater attainable bend angles. In FIG. 4, film 2 has smooth parallel surfaces 10 and 12 and is formed by two layers disposed in contact with each other: layer 4 and layer 6. Each of the layers 4 and 6 may have smooth external surface and a corrugated interface surface defined by corrugated boundary 20 between the layers. Surface 12 is configured as the light input surface and the opposing surface 10 is configured a s the light output surface.

The corrugations 8 forming boundary 20 between surface 10 and surface 12 have a linear triangular configuration and extend parallel to reference line 800 (not shown in FIG. 4). The corrugations of boundary 20 also define a plurality of adjacent interface facets. Each interface facet makes a different dihedral angle from each of the adjacent interface facets so that the corrugated surface of boundary 20 comprises a plurality of facets 24 characterized by a first dihedral angle alternating with facets 26 characterized by a second dihedral angle with respect to the prevailing plane of film 2. The refractive index $n_1$ of layer 4 is lower than refractive index $n_2$ of layer 6 so that there is provided a stepped drop in refractive index along the propagation path of light within the body of film 2.

Film 2 of FIG. 4 is configured to accept light at near grazing angles by its surface 12 internally redirect such light at up to 90° and emit the redirected light from surface 10. Particularly, film 2 may be configured to accept light striking surface 12 at angles between 0° and 20° from the surface (corresponding to 90° and 70° incidence angles with respect to a surface normal, respectively) and communicate said light a smaller angle with respect to the surface normal. An angle 60 represents the oblique angle that an incident ray 116 makes with surface 12 in layer 6 when it enters layer 6 of film 2. In the illustrated embodiment, angle 60 may take any suitable angular values and, particularly, may include very low, near-grazing angles.

Facets 24 are configured to have a smaller dihedral angle with respect to the prevailing plane of film 2 than facets 26. Furthermore, the dihedral angle of facets 24 is preferably selected to be less than an angle which is complementary to angle 60 in order to provide refraction and ray bending away from surface 12.

The dihedral angle of each of facets 26 should preferably be greater than the maximum designed value of angle 60 that light can make with surface 12 in layer 4. At the same time, the dihedral angle of facets 26 should preferably be selected to enable intercepting light refracted by a preceding adjacent facet 24 and further enable reflecting the intercepted light by means of TIR from facet 26.

In operation, referring to FIG. 4, light ray 116 enters layer 6 of film 2 at a low out-of-plane angle and makes angle 60 with surface 12 while propagating within the layer 6. Ray 116 further strikes facet 24 where it bends slightly towards the light output surface 10 by means or refraction at the interface between the lower refractive index of layer 6 and the higher refractive index of layer 4, after which it strikes the next adjacent facet 26. The slope of facet 26 defined by the dihedral angle with the plane of film 2 is selected to result in TIR at the interface between the high-index layer 4 and low-index layer 6. As a matter of optics, facet 26 communicates an additional bend angle to ray 116, this additional bend angle being twice the angle between ray 116 and facet 26. As a result, ray 116 exits from film 2 nearly perpendicularly to surface 10. It should be understood that film 2 may also be configured to emit light from surface 10 at emergence angles other than normal to the surface.

Example

Figure 5:
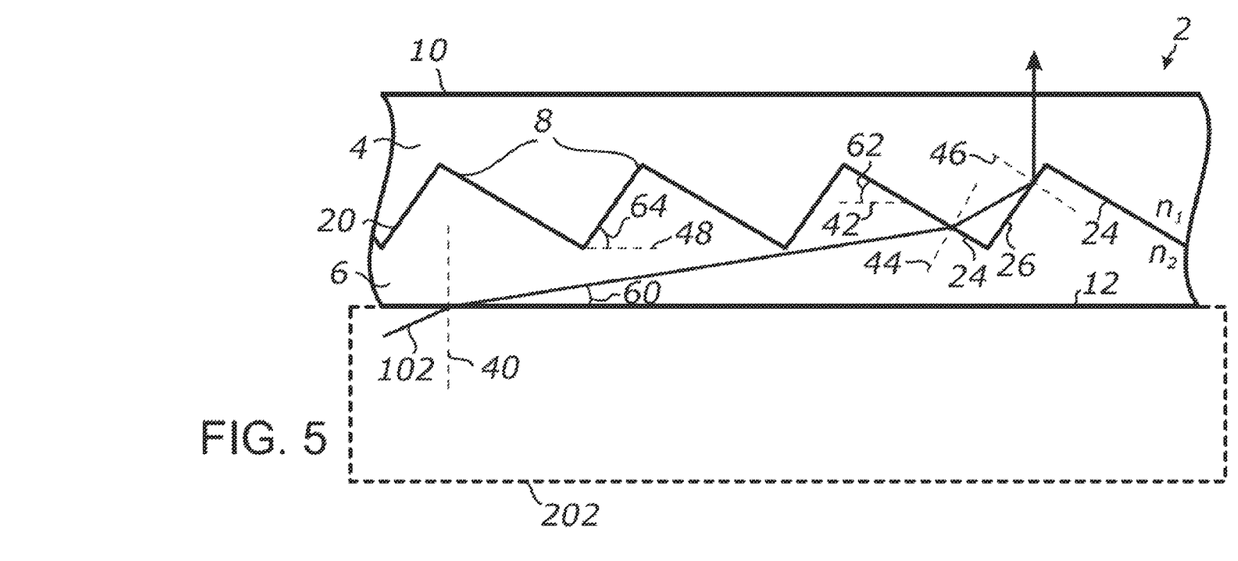
FIG. 5 illustrates the operation of a light directing film of FIG. 4 in further detail.

In FIG. 5, an example of light directing film 2 is shown as it is applied for extracting light from an optical waveguide and turning such light generally towards a perpendicular direction with respect to the film surface.

Referring to FIG. 5, an edge-lit planar waveguide 202 made from PMMA (acrylic) with a refractive index of 1.49 is configured to propagate light by means of TIR from its major surfaces. Film 2 including two transparent layers with corrugated inter-layer boundary has a total thickness of 150 microns. The height of the triangular prisms forming the boundary corrugations 8 is about 50 to 70 microns. Layer 4 of film 2 is made of optically clear polycarbonate having a refractive index of 1.58. Layer 6 of film 2 is made of PFTE AF 2400 (an amorphous fluoropolymer commercially available from Dupont™) having a refractive index of approximately 1.29. The dihedral angle 62 of each facet 24 is 28 degrees and the dihedral angle 64 of each facet 26 is 55.5 degrees.

The outer surface of layer 6 forming the light input surface of film 2 is generally smooth and transparent. It may also be specially treated to enhance the lamination and/or adhesion properties. Film 2 is laminated onto a portion of planar waveguide 202 so that layer 6 is facing the waveguide and surface 12 is disposed in a good optical contact with the waveguide. A thin layer of optical adhesive (not shown) may be provided to promote the optical contact and adhesion of film 2 to waveguide 202.

In operation, ray 126 initially propagates in waveguide 202 at an out-of-plane angle of 31 degrees. Since the angle of incidence of ray 126 with respect to surface normal 40 is complementary to the out-of-plane angle, the incidence angle of the ray onto surface 12 is 59 degrees (90°−31°=59°).

The boundary between waveguide 202 and film 2 represents an optical interface between PMMA (n=1.49) and PFTE AF 2400 (n=1.29) and may thus be characterized by a critical TIR angle of 60 degrees as defined by the Snell's law. Since the 59-degree angle of incidence of ray 126 onto such boundary is slightly lower than the TIR angle of 60 degrees, TIR is suppressed and the ray may enter layer 6 of film 2.

Upon entering layer 6, ray 126 makes a refraction angle of about 81.9 degrees with normal 40, as defined by the Snell's law of refraction. This corresponds to slope angle 60 of ray 126 being about 8.1 degrees.

Ray 126 further strikes one of the facets 24 which is inclined at angle 62 to reference line 42 being parallel to surfaces 10 and 12. It can easily be found that ray 126 makes an incidence angle of 53.9 degrees with respect to a normal 44 to the facet surface and refracts at a refraction angle of about 41.3° with respect to the same normal.

The refracted ray 126 further strikes the adjacent facet 26 which is inclined at an angle of 55.5 degrees with respect to a reference line 48 being parallel to surfaces 10 and 12. Accordingly, it can easily be found that ray 126 makes an incidence angle of 55.2 degrees with respect to normal 46 to facet 26. This incidence angle is greater than the 54.7° TIR angle at the interface between polycarbonate (layer 4) and PFTE AF 2400 (layer 6).

Therefore, ray 126 is reflected from the respective facet 26 by means of TIR and is further directed towards surface 10. Since the angle or reflection is the same as the angle of incidence, it can be shown that ray 126 striking facet 26 at 55.2-degree incidence angle will be redirected at approximately 0.3-degrees angle with respect to a normal to surface 10. Accordingly, as a near-zero incidence angle onto surface 10 is obtained ray 126 may exit from film 2 nearly perpendicular to that surface and to the prevailing plane of film 2.

It will be appreciated that, in the above-illustrated example, ray 126 entered into film 2 at a relatively low (about 8 degrees) out-of-plane angle and was turned by approximately 82 degrees towards the normal to the prevailing plane of the film. The corrugated boundary between layers 6 and 4 light has provided most of the right-angle turning function of light directing film 2.

Thus, as illustrated in the above example, light directing film 2 may be coupled to a waveguide for extracting and collimating at least the portion of light which propagates at near-TIR angles in the waveguide. Film 2 may thus provide for a controlled leakage of light into layer 6 at near-grazing angles and turn such light towards a perpendicular direction.

It is noted that the angular spread of light leaking from waveguide 202 into film 2 may be limited by appropriately selecting the refractive indices of the waveguide and layer 6. Accordingly, the light extracted and redirected by film 2 towards a surface normal may also have a limited divergence resulting in the emission of a collimated beam from the broad-area surface of the film.

Figure 6:
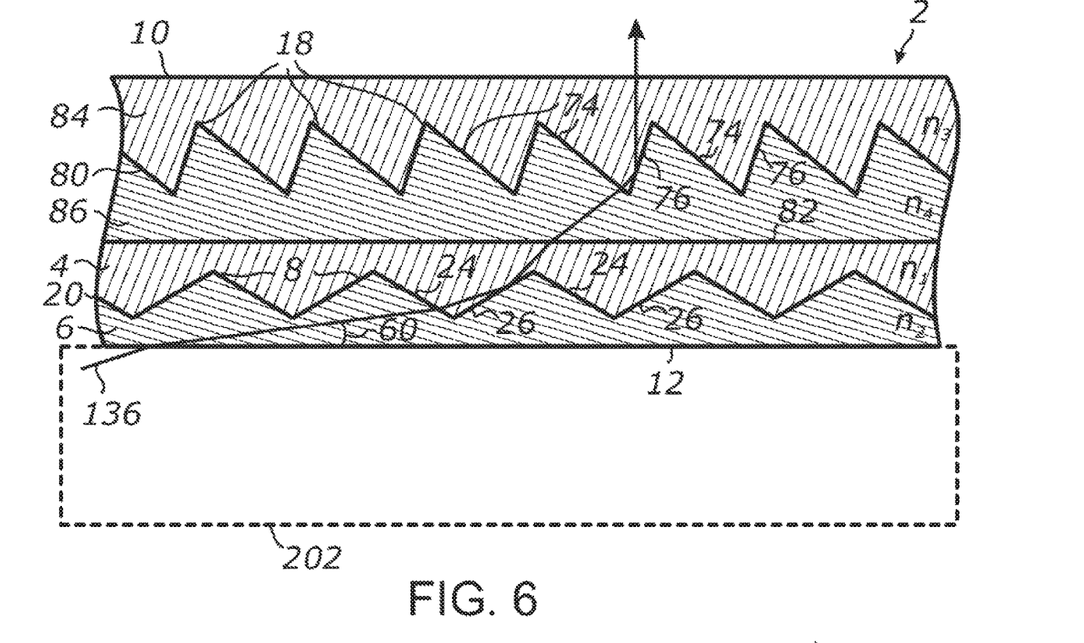
FIG. 6 is a schematic view and ray tracing for a light directing film in a stacked configuration, according to at least one embodiment of the present invention.

FIG. 6 depicts an embodiment of light directing film 2 which comprises multiple layers of optically transparent materials disposed in contact with each other and represents two single-interface light directing films stacked on top of each other. The layers have alternating refractive indices and multiple optical interfaces. At least two internal optical interfaces within film 2 may have corrugated shapes. The multi-layer stacked film 2 may be laminated on top of optical waveguide 202 which may have, for example, a planar slab configuration.

Referring to FIG. 6, light directing film 2 comprises two opposing external surfaces 10 and 12 extending parallel to each other. Both of the surfaces may be generally smooth and void of any microstructures. Surface 12 is configured for light input into film 2 and surface 10 is configured for light output from the film. In other words, the broad-area surface 12 is configured for receiving light and the opposing parallel surface 10 is configured for emitting light internally redirected in film 2.

The bottom portion of light directing film 2 comprises layer 4 and layer 6 having refractive indices $n_1$ and $n_2$, respectively. Boundary 20 between layers 4 and 6 comprises a plurality of corrugations 8 represented by alternating facets 24 and 26. Each of the facets 24 and 26 makes a relatively low dihedral angle with the prevailing plane of film 2.

Similarly, the top portion of light directing film 2 comprises layers 84 and 86 with refractive indices of $n_3$ and $n_4$, respectively. A boundary 80 between layers 84 and 86 comprises a plurality of corrugations 18 represented by alternating facets 74 and 76. The dihedral angles of facets 74 and 76 with respect to the prevailing plane of film 2 are generally greater than the dihedral slope angles of facets 24 and 26 of the lower film portion. A boundary 82 between the top and bottom films may be generally and may also comprise a thin adhesive layer (not shown) to promote adhesion between the respective layers.

According to one embodiment $n_1 < n_2$ and $n_3 < n_4$. Layers 6 and 86 may be made from the same material having lower refractive index than refractive indices of layers 4 and 84. Similarly, layers 4 and 84 may also have the same or similar refractive index. It is also noted that all of layers may have different refractive indices and may be made from different materials, provided however, that there if an outward stepped drop in material refractive index at each of the boundaries 20 and 80 along the intended transversal propagation path of light through film 2.

An advantage of the multi-layer, multi-stage film may be that it may employ high-n and low-n materials with smaller differences between the refractive indices than, for example, it was illustrated in FIG. 5, and still provide high bend angles for grazing-angle light.

In operation, referring further to FIG. 6, ray 136 exits from waveguide 202 and enters layer 6 of film 2 at oblique refraction angle 60. Ray 135 further refracts from one of the facets 24 and reflects by means of TIR from adjacent facet 26. While the bend angles at facets 24 and 26 may yet be insufficient to turn ray 136 at a right angle, each of the interactions of such ray with the boundary facets nevertheless results in a greater out-of-plane propagation angle compared to the angle at which ray 136 enters the film. Accordingly, the respective bottom portion of film 2 redirects ray 136 and turns it approximately halfway towards the surface normal.

Ray 136 further crosses boundary 82 between the lower and upper portions of film 2, with some refraction. Ray 136 further refracts at facet 74 and is reflected by means of TIR from adjacent facet 76. Accordingly, the corrugated boundary 80 further bends ray 136 and directs it towards surface 10 at a normal angle. Since surface 10 is generally smooth and transparent ray 136 emerges from surface 10 at a near-zero angle with respect to a surface normal.

Thus, the corrugated boundaries 20 and 80 of film 2 act cooperatively to bend light entering surface 12 at oblique angles. Facets 24 and 26 of boundary 20 represent a first bend stage and facets 74 and 76 represent a second bend stage for ray 136. The greater angles of facets 74 and 76 compared to facets 24 and 26 reflect the fact that ray 136 enters the second bend stage at a greater out-of-plane angle compared to the first stage and requires a different geometry of the corrugated inter-layer boundary to ensure that such ray is intercepted by the respective pair of facets and redirected by means of refraction and TIR.

It should be understood that film 2 is not limited to be used in a planar form and/or disposed on flat surfaces. Film 2 may also be made conforming to irregular surfaces and it may also be wrapped around objects such as, for example, cylindrical light pipes or large-core optical fibers.

Figure 7:
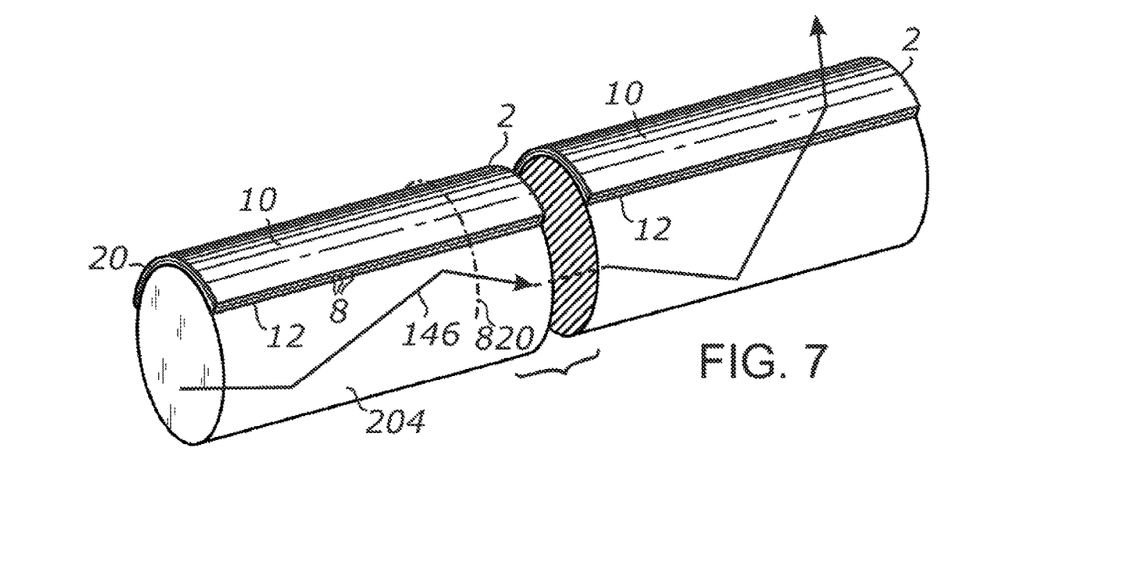
FIG. 7 is a schematic view showing a light directing film wrapped around a portion of a cylindrical waveguide, according to at least one embodiment of the present invention.

FIG. 7 depicts light directing film 2 wrapped around a portion of a cylindrical waveguide 204. Film 2 is laminated onto waveguide 204 so that the lower-index layer 6 faces the waveguide by and the higher-index layer 4 faces away from the waveguide. Optically smooth surface 12 should preferably have a good physical and optical contact with the surface of waveguide 204. Surface 12 may be glued to the waveguide using a thin layer of optical adhesive to promote such contact and eliminate any air gaps.

Linear corrugations 8 representing a boundary between different-refractive-index layers extend parallel to each other and along an arc-shaped reference line 820. Reference line 820 is shaped in the form of an arc conforming to the circular cross-section of cylindrical waveguide 204 and lies in a plane which is generally perpendicular to the longitudinal axis of the waveguide. In such a configuration, light directing film 2 may be used, for example, for extracting light from waveguide 204 and emit the extracted light in a collimated form from surface 10. In at least one embodiment, film 2 may be configured to direct the extracted light along a direction which is normal to the longitudinal axis of the cylindrical waveguide 204.

In operation, ray 146 propagates in cylindrical waveguide 204 by means of TIR at an angle with respect to waveguide's surface normal which is slightly greater than the TIR angle at the boundary of waveguide with the surrounding air. Since layer 6 has a refractive index greater than the air, TIR is suppressed in waveguide 204 at least for the uttermost out-of-plane rays propagating in the waveguide. In other words, the TIR angle at the boundary between waveguide 204 and film 2 is greater than the TIR angle at the interface between the material of the waveguide and air.

According to one embodiment, the refractive index of layer 6 may be substantially lower than that of waveguide 204 and result in ray 146 incidences into film 2 at a low out-of-axis angle which may also include near-grazing angles. Similarly to the principles described above in reference to FIG. 4 and FIG. 5, corrugated boundary 20 of film 2 may be configured to turn ray 146 towards a normal with respect to the prevailing propagation direction of light in waveguide 204 thus resulting in light emission from a longitudinal side of waveguide 204 to which film 2 is attached. For example, similarly to the principles described in reference to FIG. 5, the cross-sectional shape of corrugations 8 may be configured to redirect light rays by means of refraction from one subset of boundary facets and further redirect such rays by means of TIR from another subset of boundary facets. Since film 2 may be configured to extract light propagating within a relatively narrow range of out-of-plane angles in waveguide 204, the degree of light collimation may be precisely controlled.

Figure 8:
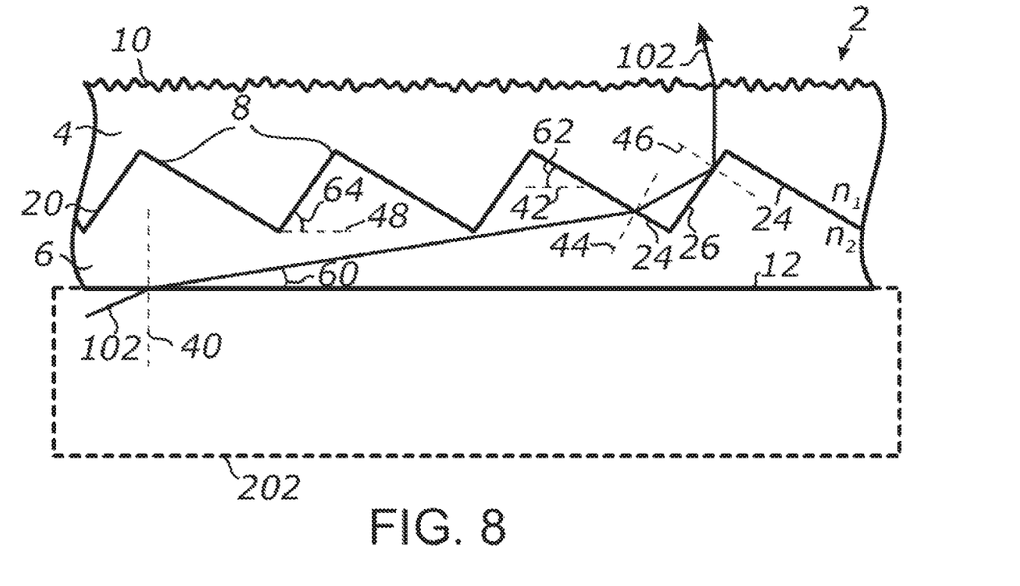
FIG. 8 is a schematic view of a portion of light directing film showing a light diffusing output surface, according to at least one embodiment of the present invention.

FIG. 8 shows an embodiment of film 2 similar to that depicted in FIG. 5 except that the light output surface 10 has a light-diffusing surface texture. According to one embodiment, the surface texture may have a random character. However, it should be understood that any other types of light-diffusing surface microstructures may also be used, such as, for example, microprisms or microlenses. The textured surface 10 may be configured to diffuse light emerging from film 2, for example, in order to provide a soft glow from the film surface and/or reduce intensity irregularities in the emitted beam.

Figure 9:
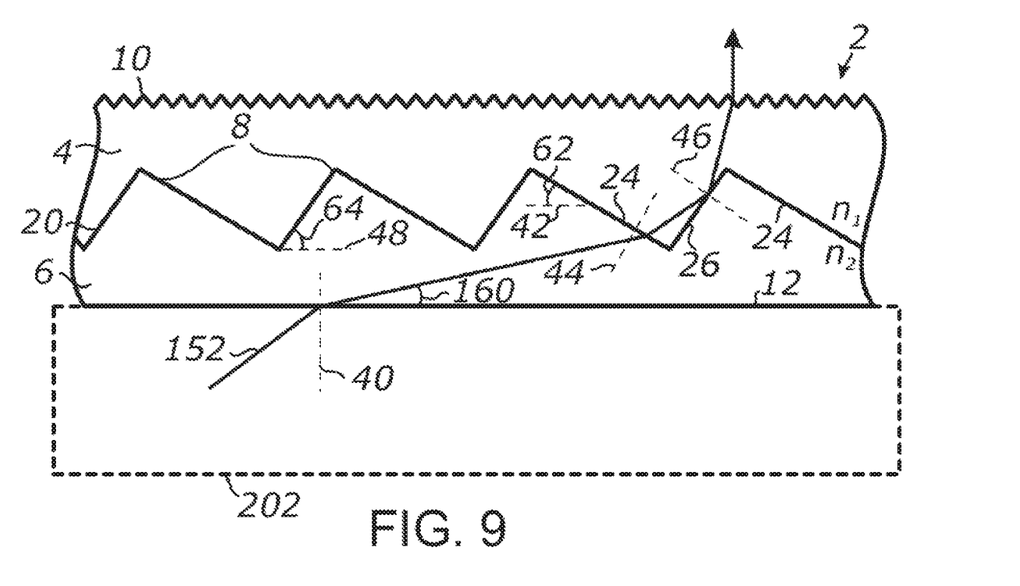
FIG. 9 is a schematic view of a portion of light directing film showing a light output surface with prismatic microstructured pattern, according to at least one embodiment of the present invention.

FIG. 9 illustrates a further variation of the light output surface 10 where such surface is textured with a pre-defined prismatic microstructured pattern. The microprisms may have a function of further redirecting light emerging from surface 10. Particularly, such function may include reducing the divergence of emitted light rays from a surface normal. According to an aspect, the function of the microprisms of surface 10 may be somewhat similar to the function of the microprisms of brightness enhancement film such as BEF film commercially available from 3M Company.

The operation of the microstructured surface 10 is further illustrated in FIG. 9 by example of a light ray 152. Ray 152 propagating in optical waveguide 202 enters optically transmissive layer 6 having refractive index $n_2$ which is lower than the refractive index of the waveguide. Upon entering into layer 6, ray 152 makes an angle 160 with respect to light input surface 12 of film 2. Ray 152 further undergo refraction at facet 24 of the corrugated boundary 20 and TIR at adjacent facet 26 of the same boundary subsequently entering layer 4 of film 2. The refractive index $n_1$ of layer 4 is preferably greater than $n_1$. To enable such two-stage bending of ray 152. However, at least in some embodiments, the difference in refractive indices or the dihedral angles of facets 24 and/or 26 may be insufficient to make a complete turn of ray 154 towards a normal to the light output surface 10. Accordingly, as illustrated in FIG. 9, the prismatic corrugations or microstructured pattern of surface 10 may be configured to provide an additional bend angle and result in ray 154 exiting at a right angle with respect to the surface plane.

It is noted that this invention is not limited to aligning corrugations 8 along a straight reference line and may be applied to the case when such corrugations extend along any other path which may incorporate straight segments, curvilinear segments or any combination thereof. Accordingly, film 2 may have any suitable dimensions and may also be formed or cut to other than rectangular shapes.

Figure 10:
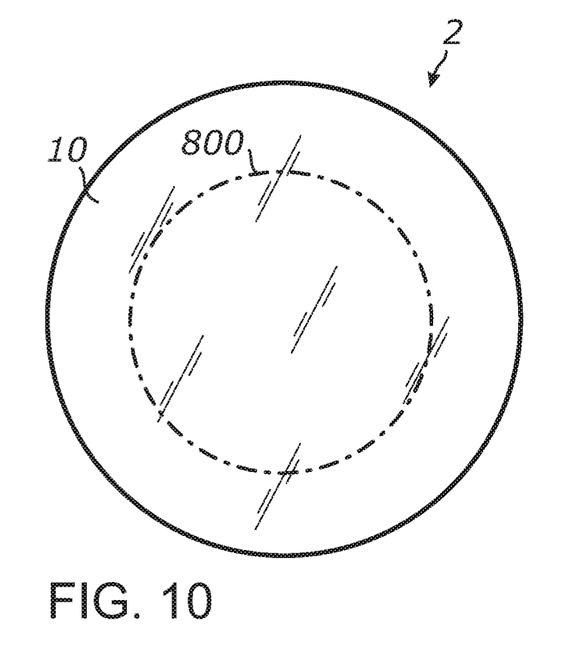
FIG. 10 is a schematic top elevation view of a light directing film showing a circular reference line, according to at least one embodiment of the present invention.
Figure 11:
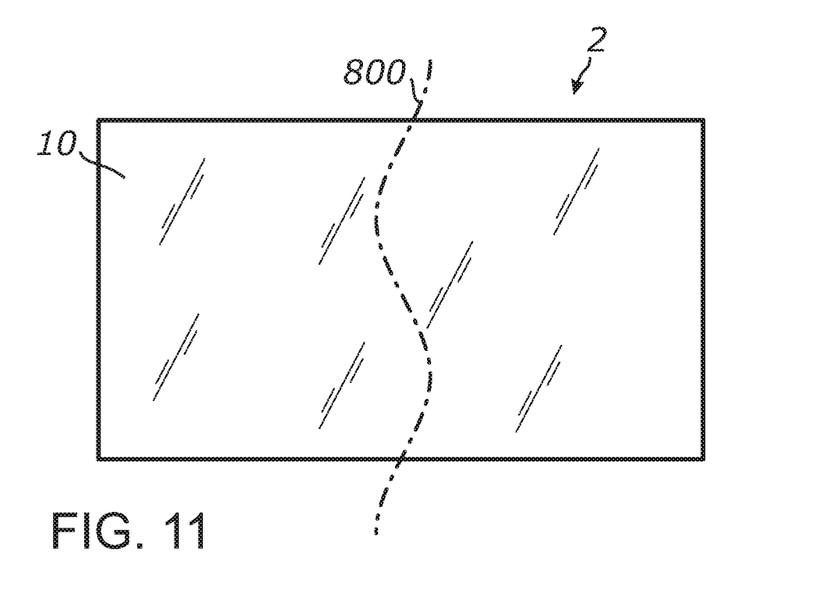
FIG. 11 is a schematic top elevation view of a light directing film showing a curvilinear reference line, according to at least one embodiment of the present invention.

FIG. 10 and FIG. 11 illustrate different exemplary configurations of film 2 and different shapes of reference line 800 which defines the path along which the linear corrugations 8 may extend across the film surface. In FIG. 10, depicted with the light emitting surface 10 facing towards the viewer, reference line 800 is a circle which is centered with respect to the circular outline of film 2. In FIG. 11, reference line 800 is curvilinear and extends generally perpendicular to a longer dimension of the rectangular film 2. It is further noted that linear corrugations 8 may extend continuously along the pre-selected reference line or they may also arranged in series where corrugations 8 may be alternating with spacing areas along such reference line.

The height and width of corrugations 8 as well as the dihedral angles formed by facets 24 and 26 may be varied in a broad range across the area of film 2. By way of example and not limitation, when film 2 is used for extracting and redirecting light from an edge-lit planar waveguide or end-lit optical fiber, the dihedral angles of facets 24 and/or 26 may increase or decrease as a function of the distance from the respective light source. Similarly, when the external light emitting surface 10 is provided with prismatic corrugations for brightness enhancement or improved light turning capabilities of film 2, the angles of the respective facets of the prisms may also be varied as a function of the distance from the light source.

Further details of operation of light directing film 2 shown in the drawing figures as well as its possible variations will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A light directing structure, comprising:
a layered sheet-form optical structure comprising a broad-area mirrored surface, a smooth outer surface, a first layer of a solid optically transmissive material having a first refractive index, and a second layer of a solid optically transmissive material having a second refractive index which is different than the first refractive index, wherein the first layer is disposed in contact with and optically coupled to the second layer; and a corrugated optical interface formed between the first and second layers and characterized by a stepped change in a refractive index, wherein the corrugated optical interface comprises a first plurality of facets alternating with a second plurality of facets, wherein the first plurality of facets forms first dihedral angles with respect to the smooth outer surface, wherein the second plurality of facets forms second dihedral angles with respect to the smooth outer surface, and wherein the first dihedral angles are different from the second dihedral angles.

2. A light directing structure as recited in claim 1, wherein the first and second dihedral angles are greater than 0° and less than 90°.

3. A light directing structure as recited in claim 1, wherein at least one of the plurality of facets is configured to redirect light propagating transversely through the layered sheet-form optical structure by means of refraction.

4. A light directing structure as recited in claim 1, wherein at least one of the plurality of facets is configured to redirect light propagating transversely through the layered sheet-form optical structure using a total internal reflection.

5. A light directing structure as recited in claim 1, wherein the corrugated optical interface represents a boundary between said first and second layers.

6. A light directing structure as recited in claim 1, wherein each of the facets longitudinally extends along an arcuate reference line.

7. A light directing structure as recited in claim 1, wherein each of the facets longitudinally extends along a curvilinear reference line.

8. A light directing structure as recited in claim 1, wherein each of the facets longitudinally extends over an area of the layered sheet-form optical structure along a circular path.

9. A light directing structure as recited in claim 1, wherein the first dihedral angles increase with a distance from a predetermined location of the layered sheet-form optical structure.

10. A light directing structure as recited in claim 1, wherein the first dihedral angles decrease with a distance from a predetermined location of the layered sheet-form optical structure.

11. A light directing structure as recited in claim 1, comprising a third layer having a third refractive index that is different from the first and second refractive indices.

12. A light directing structure as recited in claim 11, comprising a fourth layer having a fourth refractive index that is different from the first and second refractive indices.

13. A light directing structure as recited in claim 1, comprising a third layer adjacent to the second layer and having a third refractive index that is the same or similar to the first refractive index.

14. A light directing structure as recited in claim 1, wherein the layered sheet-form optical structure is configured to receive light on the smooth outer surface and output the received light from an opposite surface.

15. A light directing structure as recited in claim 1, wherein the layered sheet-form optical structure is configured to receive light on a surface opposing the smooth outer surface and output the received light from the smooth outer surface.

16. A light directing structure as recited in claim 1, wherein the lower of the two refractive indices of said first and second layers is less than 1.49.

* * * * *